(12) United States Patent     (10) Patent No.: US 9,377,778 B2
Crothers     (45) Date of Patent: Jun. 28, 2016

(54) INTEGRATION OF MANUFACTURING CONTROL FUNCTIONS USING A MULTI-FUNCTIONAL VISION SYSTEM

(75) Inventor: Phillip John Crothers, Hampton East (AU)

(73) Assignee: THE BOEING COMPANY, Chicago, IL (US)

( * ) Notice: Subject to any disclaimer, the term of this patent is extended or adjusted under 35 U.S.C. 154(b) by 673 days.

(21) Appl. No.: 12/859,926

(22) Filed: Aug. 20, 2010

(65) Prior Publication Data

US 2011/0200245 A1    Aug. 18, 2011

Related U.S. Application Data

(60) Provisional application No. 61/305,336, filed on Feb. 17, 2010.

(51) Int. Cl.
*G06K 9/00* (2006.01)
*G05B 19/418* (2006.01)
*B64F 5/00* (2006.01)

(52) U.S. Cl.
CPC ........... *G05B 19/4183* (2013.01); *B64F 5/0009* (2013.01); *Y02P 90/10* (2015.11)

(58) Field of Classification Search
None
See application file for complete search history.

(56) References Cited

U.S. PATENT DOCUMENTS

| | | | |
|---|---|---|---|
| 5,380,978 A * | 1/1995 | Pryor | 219/121.64 |
| 5,548,515 A * | 8/1996 | Pilley | G01C 23/00 340/961 |
| 5,721,677 A | 2/1998 | Pryor | |
| 6,415,191 B1 | 7/2002 | Pryor | |
| 6,828,525 B1 | 12/2004 | Hayes et al. | |
| 6,856,859 B1 * | 2/2005 | Bett et al. | 700/222 |
| 7,385,499 B2 * | 6/2008 | Horton et al. | 340/539.13 |
| 7,925,526 B2 | 4/2011 | Catala et al. | |
| 2004/0199656 A1 * | 10/2004 | Pintsov | 709/231 |
| 2005/0228708 A1 | 10/2005 | Catala et al. | |
| 2007/0280501 A1 * | 12/2007 | Walton | 382/100 |
| 2009/0080715 A1 * | 3/2009 | van Beek et al. | 382/118 |
| 2010/0082578 A1 * | 4/2010 | Werner | G06Q 10/087 707/706 |
| 2011/0050878 A1 * | 3/2011 | Wells et al. | 348/86 |

FOREIGN PATENT DOCUMENTS

| | | | |
|---|---|---|---|
| GB | 2478039 A | | 8/2011 |
| JP | 11074326 A | * | 3/1999 |
| WO | 0040195 A1 | | 7/2000 |
| WO | 0223121 A1 | | 3/2002 |

OTHER PUBLICATIONS

International Search Report, dated Jun. 10, 2011, regarding Application No. GB1102181.3 (GB2478039), 2 pages.
Laser Projection Technologies, "Standard Laser Projectors," http://www.lptcorp.com/Laser%20Projection%20Laser%20Projectors.htm, Mar. 1, 2011, 4 pages.

(Continued)

*Primary Examiner* — Ariel Yu
(74) *Attorney, Agent, or Firm* — Yee & Associates, P.C.

(57) ABSTRACT

A manufacturing control system comprises a vision system for viewing operations within a manufacturing area and for producing vision data representing the viewed operations. A systems control analyzes the vision data, and controls at least two control functions related to the manufacturing operations based on the analyzed vision data.

22 Claims, 8 Drawing Sheets

(56) References Cited

OTHER PUBLICATIONS

Leica Geosystems, "Leica T-Mac," http://metrology.leica-geosystems.com/en/Leica-T-Mac_66262.htm, accessed Jun. 28, 2012, 1 page.
Pilz International, "Safe 3D Vision—The Next Big Step in Safety," http://metrology.leica-geosystems.com/en/Leica-T-Mac_66262.htm, Jan. 31, 2008, 2 pages.
GB1102181.3, Search Report, Jun. 13, 2011.
http://www.lptcorp.com.
http://www.leica-geosystems.com/en/Laser-Tracker-Systems-Leica-T-Mac_66262.htm.
www.pilz.com/au/company/press/article/sub/technical_editorials/articles/02500/index.jsp.
IP Australia Patent Examination Report No. 1, dated May 22, 2015, regarding Application No. 2011200089, 3 pages.
IP Australia Notice of Acceptance, dated Jul. 10, 2015, regarding Application No. 2011200089, 2 pages.

* cited by examiner

INTEGRATION OF MANUFACTURING CONTROL FUNCTIONS USING A MULTI-FUNCTIONAL VISION SYSTEM

CROSS REFERENCE TO RELATED APPLICATIONS

This application claims the benefit of Provisional U.S. Patent Application No. 61/305,336 filed Feb. 17, 2010, which is incorporated by reference herein.

TECHNICAL FIELD

This disclosure generally relates to vision and control systems used in manufacturing environments, and deals more particularly with a multi-functional vision system used to integrate multiple manufacturing control functions.

BACKGROUND

Various types of vision systems have been employed in manufacturing environments to control specific manufacturing operations, such as machine operations or inspection processes. These vision systems may employ one or more single-purpose cameras or similar image recording devices that are dedicated to monitoring a particular manufacturing activity. For example, laser trackers, laser radars and photogrammetry techniques have been used to measure parts or assemblies in manufacturing areas for quality assurance, and have sometimes been adapted for automation control through external feedback systems. These types of measurement systems often require expensive, dedicated hard tooling and may be relatively costly to maintain.

Single use control systems have also been employed to control logistics, safety and/or automation in manufacturing environments. For example, lean tracking methods such as RFIDs (radio frequency identification) may be used to monitor the logistics of operations in a manufacturing area. Similarly, single use devices such as light curtains, fences, safety visions and area scanners have been used to monitor safety in manufacturing areas, however these systems have not been adapted for logistics or automation control. The use of single purpose systems for monitoring a particular control function (i.e. automation, logistics, quality, safety) may add to both capital costs and operating expenses, since each of these systems may remain idle when they are not in use.

Accordingly, there is a need for a control system that may be used to control multiple functions in a manufacturing environment, including automation, logistics, quality and safety, using a single, multi-functional vision system. There is also a need for a method of integrating multiple manufacturing control functions using a common vision system.

SUMMARY

The disclosed embodiments employ a multi-functional vision system that may be employed to integrate and control two or more manufacturing control functions, such as for example and without limitation, automation control, logistical control, quality control and safety control. The vision system uses flexible, distributed, area monitoring vision sensors such as pan-tilt-zoom cameras which zoom out for wider area monitoring or zoom in for detailed work, for multifunctional usage. The same individual or distributed cameras may be teamed or individually located, to conduct assembly geometric functions, logistic monitoring through object recognition and image comparisons, and external positional feedback to automation and automation/area safety monitoring for manufacturing operations. One advantage of the disclosed multi-functional vision system is that equipment utilization is increased because a single vision system is used to control multiple control functions, and is thus more heavily utilized compared to single purpose systems. Similarly, the multi-functional vision system is cost effective and may obviate the need for various specialized hardware and single purpose equipment needed control some manufacturing control functions. The disclosed multi-functional vision system may use standardized equipment which may further reduce capital costs as well as operating expenses. The multi-functional vision system is also advantageous in that it is non-intrusive and conducts monitoring operations in-situ to manufacturing operations, thus reducing the need for interrupting or stopping operations in order to access specialized equipment, such as a laser tracker and an operator. Finally, the disclosed multi-purpose vision system is advantageous when used to control automation systems, since specific skill sets are not required to operate the system or to interrogate manufacturing operations.

The vision system allows real time monitoring of work completion through a combination of logistics and automation control. Incomplete work or out of sequence work may be detected for quality control. Parts and features may be measured in an as-built condition, and non-conformance can be detected and reported for quality control. Real time measurement feedback to other processes can be provided for purposes of automation control and logistics. The vision system may function as a real time compliment to normal object tracking systems, such as RFID (radio frequency identification), through lean or operation recording. Real time feedback to assembly or machines may be conducted by using the vision system to track LEDs on machines used in a manufacturing area. The vision system may also be used to provide stereo imaging in order to monitor a manufacturing area for safety purposes. Assembly measurement can be conducted automatically by the vision system without inhibiting other value adding processes, and logistics can be updated in real time and reported, as required in real time.

According to one disclosed embodiment, a manufacturing control system is provided, comprising at least two manufacturing control functions for controlling manufacturing operations within a manufacturing area, and a vision system for viewing objects within the manufacturing area and for producing images of the viewed objects. The control system further comprises a systems control for extracting vision data from the images and for providing the extracted image data to the at least two manufacturing control functions. The manufacturing control function may include at least two of automation control, logistics control, safety control and quality control. The vision system includes vision sensors which include pan, tilt and zoom functions. The control system may further comprise simulation software for simulating operations within the manufacturing area based on the extracted vision data. The control system may also include a laser projection system for projecting nominal data onto objects within the manufacturing area that may be viewed by the vision system, wherein the systems control is operative to use the nominal data to locate features on the objects within the manufacturing area using images of the objects recorded by the vision system. Each of the manufacturing control functions includes software for interrogating the vision system and for analyzing the extracted vision data.

According to another disclosed embodiment, a manufacturing control system comprises a vision system including a plurality of vision sensors, a plurality of manufacturing control functions, and a systems control. The vision sensors view objects within a manufacturing area and record images of the viewed objects. The manufacturing control functions control manufacturing operations within the manufacturing area, and each includes means for analyzing vision data and for controlling a manufacturing operation based on the results of the analysis. The systems control is operative for controlling the vision system and for providing image data to each of the manufacturing control functions using the images recorded by the vision sensors. The vision sensors may comprise a plurality of cameras that may record images in differing formats. The manufacturing control functions includes at least two of: an automation control function adapted for controlling automated equipment within the manufacturing area, a logistic control function adapted for controlling logistics of the operations within the manufacturing area, a safety control function for adapted for controlling safety of the operations within the manufacturing area, and a quality control function for controlling the quality of items manufactured in the manufacturing area. The means for analyzing vision data may include a software program for interrogating the vision system and for analyzing the vision data. The control system may further comprise a 3-D simulation software program used by the systems control for simulating operations within the manufacturing area based on the extracted vision data.

According to still another embodiment, a computer implemented method is provided of controlling operations within a manufacturing area. The method comprises viewing the manufacturing area with a vision system, including using vision sensors to view objects within the manufacturing area and record images of the viewed objects; extracting vision data from the recorded images; and using the extracted vision data to perform at least two manufacturing control functions in the manufacturing area. The method may include least one of: determining whether work in a manufacturing operation has been completed; determining whether work in a manufacturing operation has been completed out-of-sequence; performing measurements of parts; and determining whether as-built parts conform to predetermined specifications. The method may further comprise sending the vision data extracted from the same image to at least two manufacturing control functions at differing preselected times. The method may also comprise using the extracted vision data to perform automation control, logistics control, quality control and safety control functions within the manufacturing area, and generating a 3-D simulation of operations in the manufacturing area based on the extracted vision data.

BRIEF DESCRIPTION OF THE ILLUSTRATIONS

DETAILED DESCRIPTION

Figure 1:
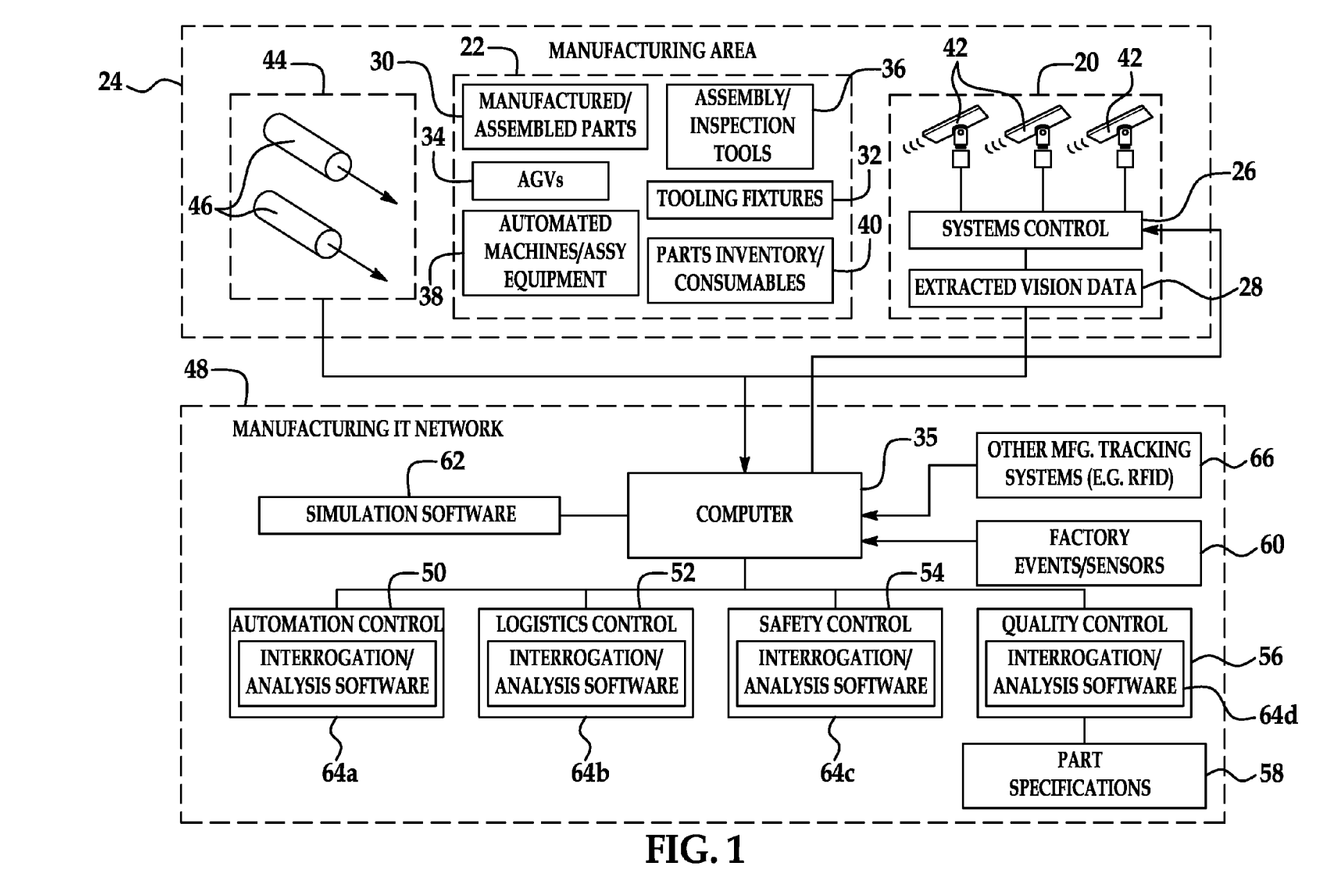
FIG. 1 is an illustration of a combined block and schematic diagram of a multi-functional vision system integrating multiple control functions within a manufacturing area.

Referring first to FIG. 1, the disclosed embodiments relate to a multi-functional vision system 20 used to integrate two or more of automation, logistics, safety and quality control functions 50, 52, 54 and 56 respectively, within a manufacturing area 24. The vision system 20 includes one or more vision sensors 42 for viewing objects 22 and activities within the manufacturing area 24. The vision sensors 42 generate images that are converted into vision data 28 representing the objects and features of the objects 22 which the sensors 42 are directed to view and/or monitor. The monitored objects 22 may include, but are not limited to manufactured and/or assembled parts 30, tooling and fixtures 32, AGVs (automated guided vehicles) 34, assembly/inspection tools 36, automated machines and assembly equipment 38 and parts inventory and consumables 40, to name only a few. The vision system 20 may also include a systems control 26 for coordinating the operation of the vision sensors 42 and for extracting vision data 28 from the images recorded by the vision sensors 42. The systems control 26 may comprise one or more programmed computers or processors.

Figure 3:
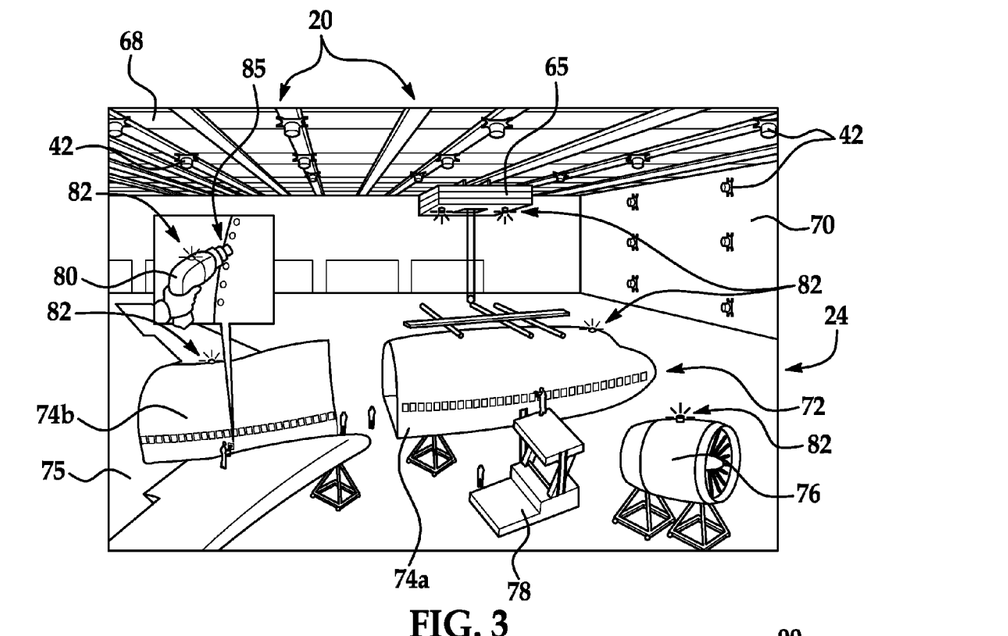
FIG. 3 is an illustration of an isometric view of a manufacturing area employing the multi-functional vision system, wherein an aircraft is being assembled.

The vision sensors 42, sometimes referred to hereinafter as "cameras" 42 may be, for example and without limitation, pan-tilt-zoom type digital cameras which zoom out for wider area monitoring and which zoom in for detailed work. One or more groups of the cameras 42 may operate together as teams, or the cameras 42 may operate individually to complete various tasks. Referring to FIG. 3, two or more of the cameras 42 may be ganged together and mounted on a common base 84 for panning and tilting about orthogonal axis 86 and 88. The cameras 42 may, but need not be uniform in terms of types, image resolutions, or other capabilities throughout the manufacturing area 24, and may record images in differing formats, however their operation is coordinated and controlled from a single systems control 26.

The vision system 20 may be used in combination with a laser projection system 44 to perform quality control functions. The laser system 44 includes one or more laser projectors 46 that project nominal data on an object 22 such as a part 30, and the cameras 42 may be used to check the projected data against the as-built condition of the object 22 of the part 30. The laser projectors 46 may also be used to display structured light patterns (not shown) which may be used to monitor part contour and deflection during assembly.

The vision system 20 may be interfaced with the manufacturing IT (information technology) network 48 which may be used to manage and/or control various operations within the manufacturing area 24. The manufacturing IT network 48 may include one or more computers 35 to control manufacturing operations, including automation control functions 50, logistics control functions 52, safety control functions 54 and quality control functions 56. The network 48 may include any of a variety of other manufacturing tracking systems 66 such as RFID systems (radio frequency identification) used for tracking the location and/or status of the objects 22. The computer 35 may also use factory events or other factory sensors 60 to control manufacturing operations, as well as to activate and instruct the vision system 20.

As will be discussed below in more detail, the systems control 26 controls the operation of the cameras 42 and extracts vision data 28 from images before being sent to the computer 35 for use by the manufacturing control functions 50-56. Suitable 3-D simulation software 62 may be used by the computer 35 to simulate operations in the manufacturing area 24 based on information contained in the extracted vision data 28 as well as other data inputs, such as factory events recorded by sensors 60. The 3-D factory environment simulation updates according to area monitoring cameras 42 and factory events such as recording of an operation beginning or being completed in the manufacturing area 24. In other words, factory events may trigger the cameras 42 to focus on specific objects 22 or activities, including teaming, and record specific data for quality assurance or real time measurement feedback, or pan out to conduct area monitoring, including teaming for safety and/or logistics.

Each of the control functions 50, 52, 54 and 56 uses respectively associated interrogation and analysis software 64a, 64b, 64c, 64d to analyze the extracted vision data 28, and to control automation, logistics, safety and quality within the manufacturing area 24. For example, the interrogation and analysis software 64d used by the quality control function 56 may request the systems control 26 to direct cameras 42 to measure certain features of assembled parts 30 in the manufacturing area 24, and the resulting vision data 28 will then be analyzed using the software 64d to determine whether the measured features meet part specifications 58. Similarly, the cameras 42 may be directed to monitor the status and/or position of automated machines or assembly equipment 38, and the extracted vision data 28 is analyzed by the software 64a to determine how and/or when the machines and assembly equipment 38 should be indexed or controlled for the next cycle or part.

The logistics control function 52 may request that the cameras 42 be directed to monitor the position and/or status of parts 32, tools 36, tooling/fixtures 32 or parts inventories/consumables 40 in order to coordinate manufacturing operation logistics. The software 64c used by the safety control function 54 may interrogate and analyze extracted vision data to ensure that safety standards are maintained and to detect situations in the manufacturing area that may require intervention for safety purposes. For example, interrogation and analysis software 64c used by the safety control function 54 may predict a collision between AGVs 34 based on the extracted vision data 28 recorded by the cameras 42, and may intervene to stop movement of the AGVs 34 in order to prevent the predicted collision.

Figure 2:
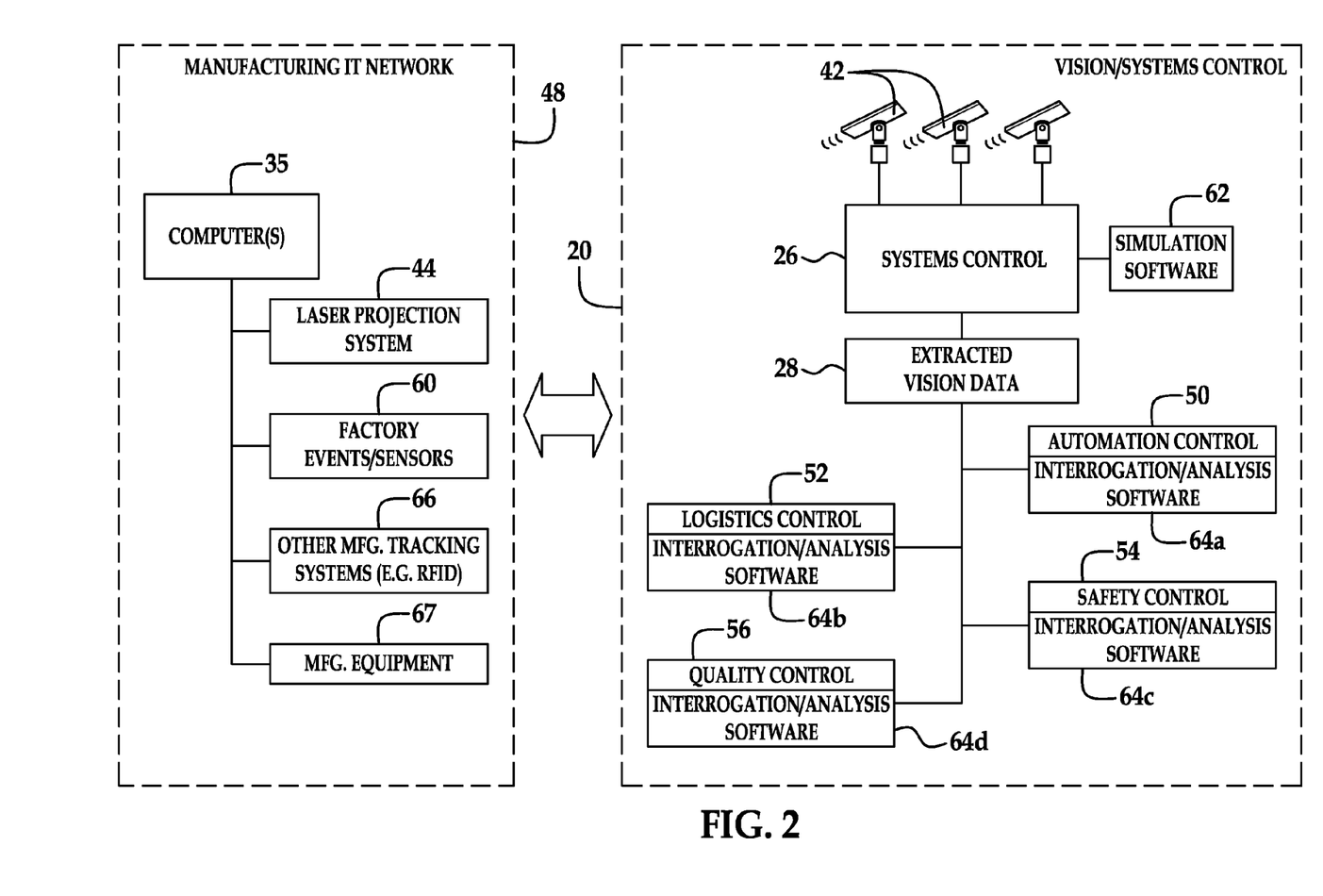
FIG. 2 is an illustration of a combined block and schematic diagram of an alternate embodiment showing a different form of system architecture.

In alternate embodiments, one or more functions performed by the computer 35 in the network 48 may be performed by the systems control 26, and the simulation software 62 may likewise be run on the systems control 26. For example, FIG. 2 illustrates an alternate embodiment of the vision system 20 in which the control functions 50-56 are part of the vision system 20 and communicate directly with the systems controls 26. Running the 3-D simulation software 62, the systems control 26 generates a 3-D simulation of the manufacturing area 24 (FIG. 1) which reflects the information developed by the cameras 42 and the control functions 50-56.

FIG. 3 illustrates a typical manufacturing area 24 in which an airplane 72 is being assembled. The manufacturing area 24 includes a factory floor 75, walls 70 and a ceiling 68. Cameras 42 or other types of vision sensors 42 mounted on the ceiling 68 and walls 70, monitor operations in the factory area 24, and form part of the vision system 20 that may be used integrate the control functions 50-56 in the manufacturing area 24. In the illustrated example, retro-reflectors 82 are placed on two fuselage sections 74a, 74b, on the engine 76, on overhead crane 65 and one or more tools 80 used during the fabrication and assembly process. Using the retro-reflectors 82, the vision system 20 may be used to monitor the particular location and exact relative positions of the fuselage sections 74a, 74b, engine 76, tools 80 and overhead crane 65 for automation, logistics, safety and quality control purposes. For example, the cameras 42 may be used to generate vision data that may be analyzed by quality control function 56 to determine whether the two fuselage sections 74a, 74b have been brought into proper alignment with each other. This same vision data may be analyzed by the logistics control function 52 to determine whether the assembly of these two sections 74a, 74b has been completed.

Similarly, the vision system 20 can be used to determine whether the engine 76 has been properly staged at the proper location in readiness for attachment to the aircraft 72. Extracted vision data 28 may similarly be used to determine the exact position of an assembly platform 78 used by workers to assemble the aircraft 72 for purposes of logistical or safety control. Tools 80 can be monitored to determine whether one or more assembly operations have been completed at specified locations, such as the installation of rivets 85.

Figures 4, 5:
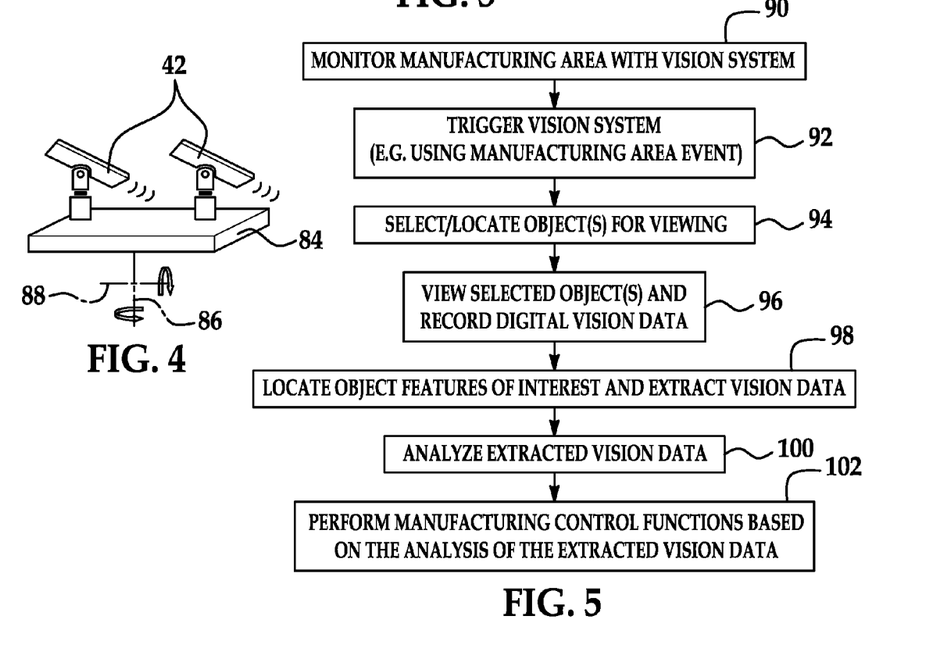
FIG. 4 is an illustration of a pair of teamed cameras mounted on a common platform for pan, tilt and zoom functions.
FIG. 5 is an illustration of a flow diagram of a method of performing multiple control functions in a manufacturing environment using the multi-functional vision system.

FIG. 5 illustrates a method of integrating multiple control functions 50-56 using a common vision system 20. Beginning at 90, the vision system 20 is used to monitor a manufacturing area 24. At 92, the vision system 20 is triggered by an event, which may be an event occurring in the manufacturing area, such as the detection of an RFID tag (not shown) within a specific section of the manufacturing area 24. Next at 94, one or more objects 22 are selected and located for viewing by the cameras 42. At step 96, the cameras 42 are directed to point to the selected object, through panning, tilting and/or zooming, and to record the viewed the image as digital vision data. Next at 98, features of interest on the object within the viewed image are located, and vision data is extracted related to these features. At 100, the extracted vision data is analyzed. For example, features of the object 22 may be measured for quality control purposes or to determine whether a work task has been completed. Similarly, features can be analyzed either to recognize an object or in order to compare, for example, an as-built assembly with a reference image. Finally, at 102, manufacturing control functions, including automation, logistics, safety or quality may be performed based on the analysis of the vision data in step 100.

Figure 6:
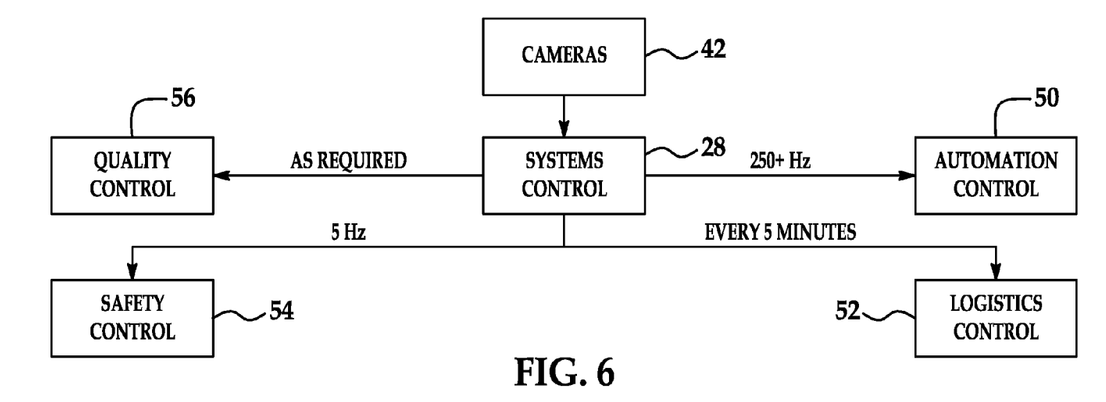
FIG. 6 is an illustration of an overall block diagram showing how the systems control periodically provides vision data to each of the control functions using a common set of vision sensors.

FIG. 6 illustrates the overall architecture of the vision system 20, including examples of the frequencies with which vision data 28 may be extracted from images recorded by the cameras 42 and provided to the automation, logistics, safety and quality control function 50, 52, 54 and 56 respectively, for analysis. In one practical example, the extracted vision data 28 may be provided to the quality control function 56 on an as required basis, and may be provided to the logistics control function 52 every 5 minutes. Extracted vision data 28 may be provided to the automation control function 50 at a rate of 250+Hz, and to the safety control function 54 at a rate of 5 Hz. The systems control 26 may be programmed with a 3-D CAD simulation environment software 62 (FIG. 2) which instructs the individual cameras 42 where and when to point. This simulation environment may also be used to direct the systems control 26 when to engage each of the automation, logistics, safety and quality control functions 50-56 respectively. In this manner, extracted vision data 28 is sent by the systems control 26 to the appropriate control function 52-56 at the correct times, and frequency rates.

The systems control 26 effectively splits the image frames recorded by the cameras 42 and sends vision data 28 extracted from these images at required time and with the required frequency to the individual control functions 50-56. It should be noted here that although four control functions 50-56 are provided, the vision system 20 may be employed to control any combination of these control functions. Thus, for example, the multifunctional vision system 20 may be used to provide functionality for quality and safety, or for safety and logistics control, or for quality and logistics control, or for safety, quality and logistics control, or for safety and automation control.

Figure 7:
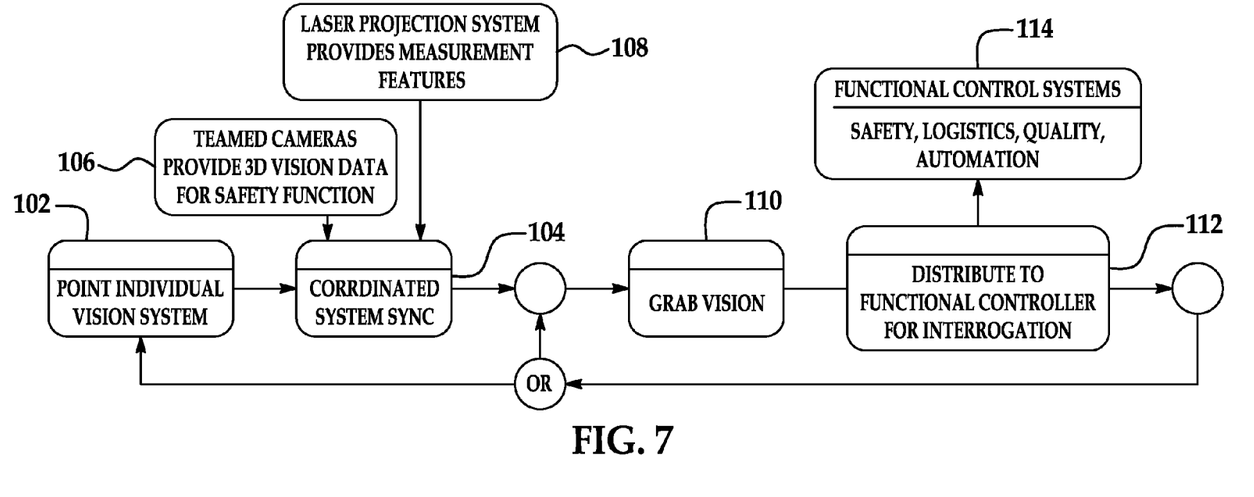
FIG. 7 is an illustration of a block diagram showing the vision capture control functions.

FIG. 7 illustrates additional details of a process for capturing images using the vision system 20. At 102, one or more of the cameras 42 is directed to point to a particular area or object 22 within the manufacturing area 24. At 104, the synchronization of various components of the vision system 22 is coordinated. For example, teams of the cameras 42 may be selected and directed to view and monitor particular sections of the manufacturing area 24 for purposes of controlling safety functions. Similarly, the laser projection system 44 (FIG. 1) is synchronized to provide visual scale and measurement features as part of the extracted vision data 28. At 110, the images recorded by the cameras 42 are grabbed on a frame-by-frame basis, and at 112, these image frames are distributed in the form of extracted vision data 28 to the functional systems 50-56 discussed previously, at times and frequencies that are preprogrammed by the 3D CAD simulation environment software 62 previously discussed in connection with FIG. 6. The distributed image frames are then analyzed by the control function software 64a-64d (FIG. 1).

Figure 8:
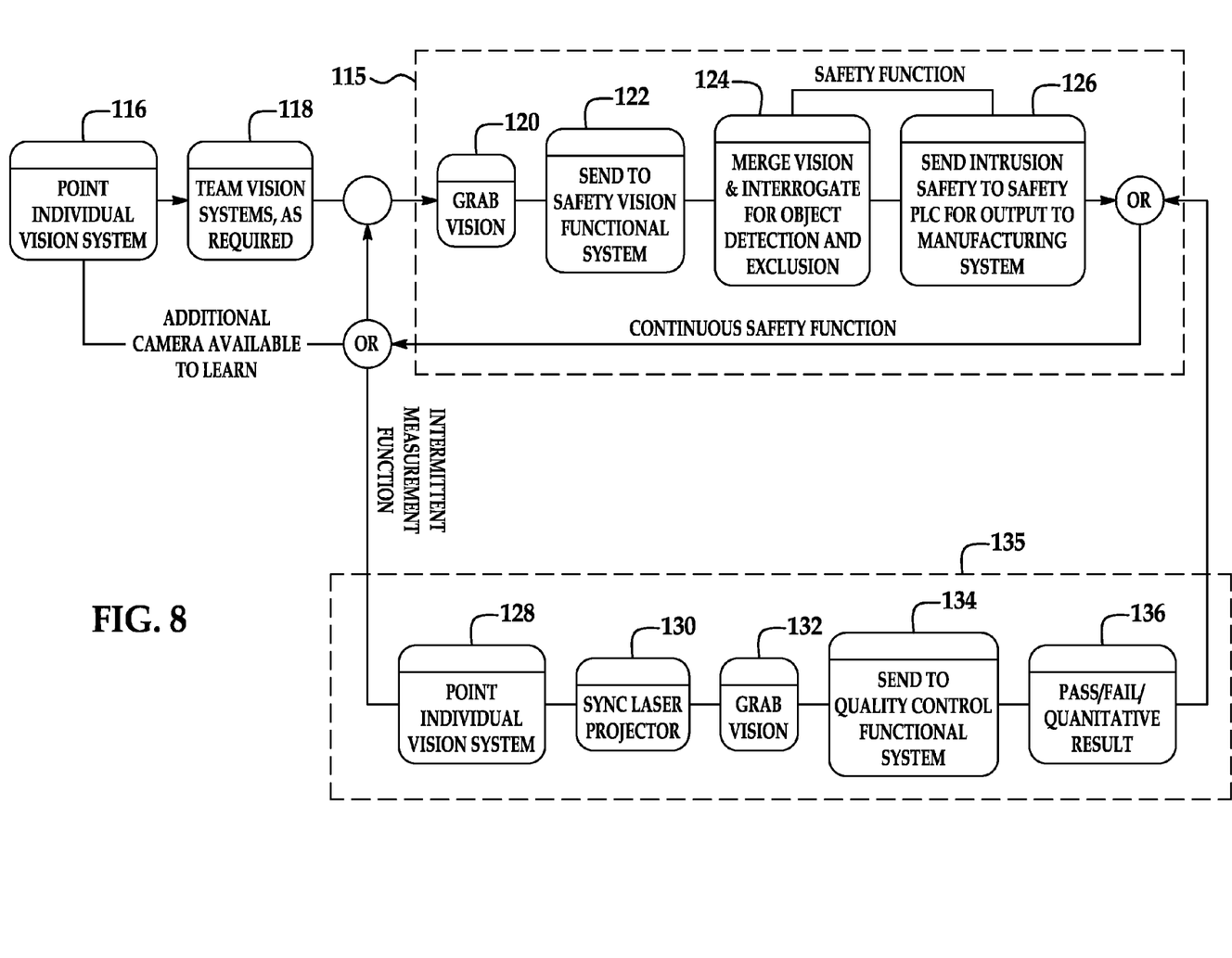
FIG. 8 is an illustration of a flow diagram showing multi-functional vision capture and control for safety and quality control functions.

FIG. 8 illustrates the vision capture process for a typical safety and quality control example. The steps required for carrying out safety control functions are shown within the broken line 115. At 116, individual cameras 42 are directed to point to a particular object 22 or section of the manufacturing area 24. At 118, the cameras 42 are teamed as required in order to record 3-D images of the area being viewed. The image frames being recorded or "grabbed" are synchronized with each other to provide the same picture for image merging. At 120, the synchronized image frames are grabbed and are sent to the safety function 54 at 122. At 124, the merged images are interrogated to accept or exclude certain objects in the images. At 126, data representing the status of an intrusion represented by the object detection performed at 124 is sent to a computer such as the computer 35 shown in FIG. 1, which controls manufacturing systems as part of the manufacturing IT network 48. Images recorded and processed in steps 116-126 may occur on an on-demand basis triggered by a manufacturing event, or may be carried out on a continuous or periodic basis, for example at a rate of 5 Hz in order to track, the movement of machinery and to assure that the machines or other objects move safely within the manufacturing area 24.

The steps required for carrying out quality control are shown within the broken line 135, and may be performed on an intermittent basis to perform measurements related to quality control. For example, and without limitation, these measurements may be carried out once every hour or for a period of five minutes three times a day, etc. These intermittent measurements may be performed by pointing and zooming in individual ones of the cameras 42 at step 128. When the vision system 20 carrying out the steps 115 required for the safety function at the time the measurement function is requested, then the safety function must be temporarily terminated, or alternatively, one or more cameras 42 may be substituted to perform the measurement function while the safety function continues. At step 130, one or more laser projectors 46 are synchronized with the vision system 20, following which at 132 one or more images are grabbed that have been recorded by the cameras 42 and these images are sent to the quality control function 56, at step 134. At 136, the analysis software 64d determines whether the measurement passes or fails, or alternatively, provides a quantitative result indicative of part quality.

Figure 9:
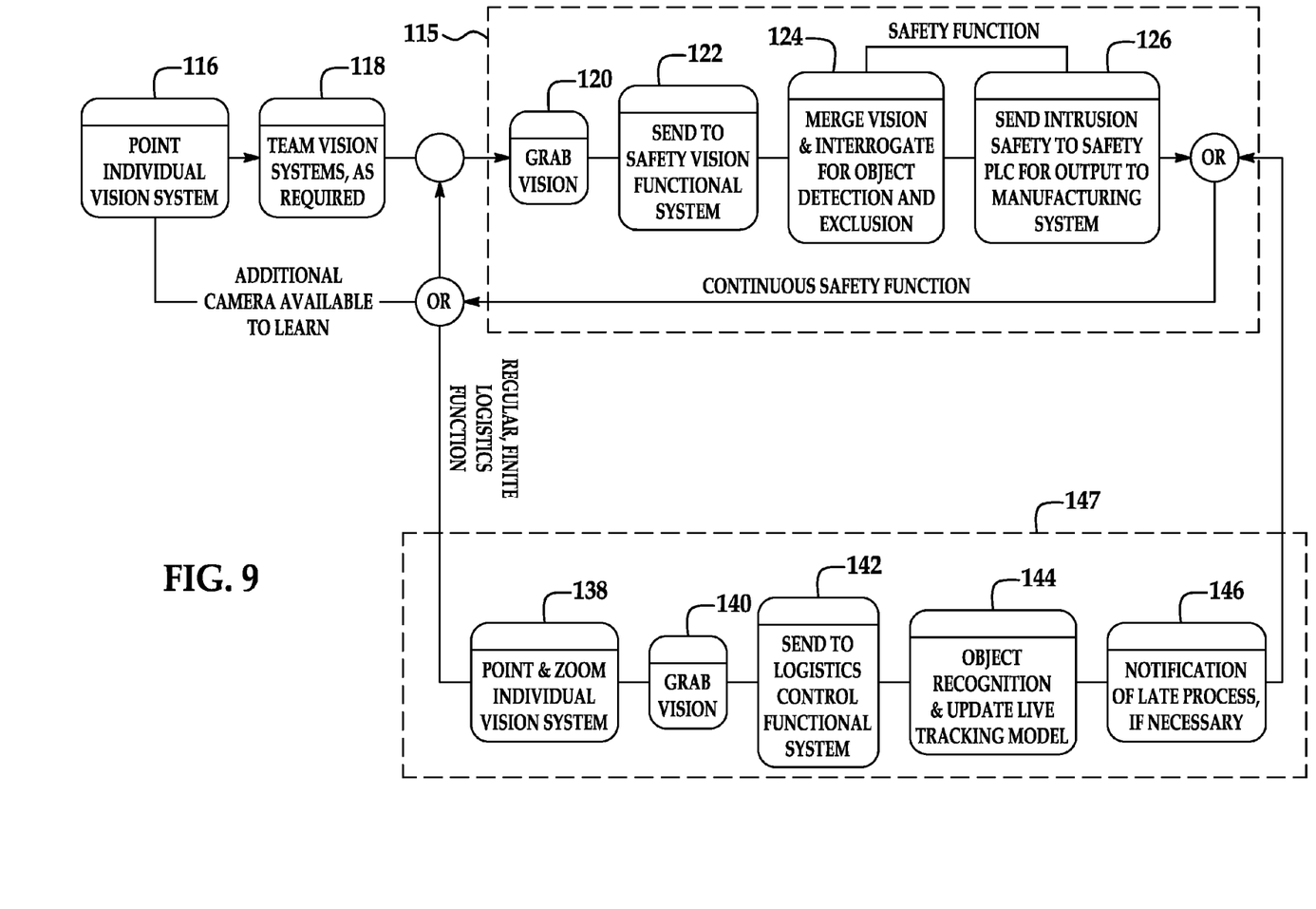
FIG. 9 is an illustration of a flow diagram of multi-functional vision capture and control for safety and logistics functions.

Attention is now directed to FIG. 9 which illustrates the steps involved in an application of the vision system 20 to perform the combination of the safety control function 54 (FIGS. 1 and 6), and the logistics control function 52. The steps required to carry out the safety control function 54 are shown within the broken line 115, while the steps required to carry out the logistics control function 52 is shown within the broken line 147. The logistics control function 52 may be performed on an intermittent basis, for example, in which an image frame is grabbed every five minutes. In some cases, the cameras 42 may be used to view locations within the manufacturing area 24 that have the same field of view as the cameras 42 used to carry out the safety function 115. However in other applications, it may be necessary to point and zoom individual ones of the cameras 42, as shown at 138, where the objects 22 that are the subject of the logistics function 147 are not within the field of view of the cameras 42 used to perform the safety function 54.

At 140, one or more image frames recorded by the cameras 42 are grabbed and are sent to the logistics control function 52 at step 142. At step 144, the analysis software 64b used by the logistics control function 52 is used to recognize particular objects within the image that was grabbed at 140, and this information is used to update a live tracking model and the live 3D simulation environment that is used to track objects against expected location and times. In the event there is a disparity between the expected and actual location and times of the object 22, then a notification of a late process is issued at step 146, if necessary.

Figure 10:
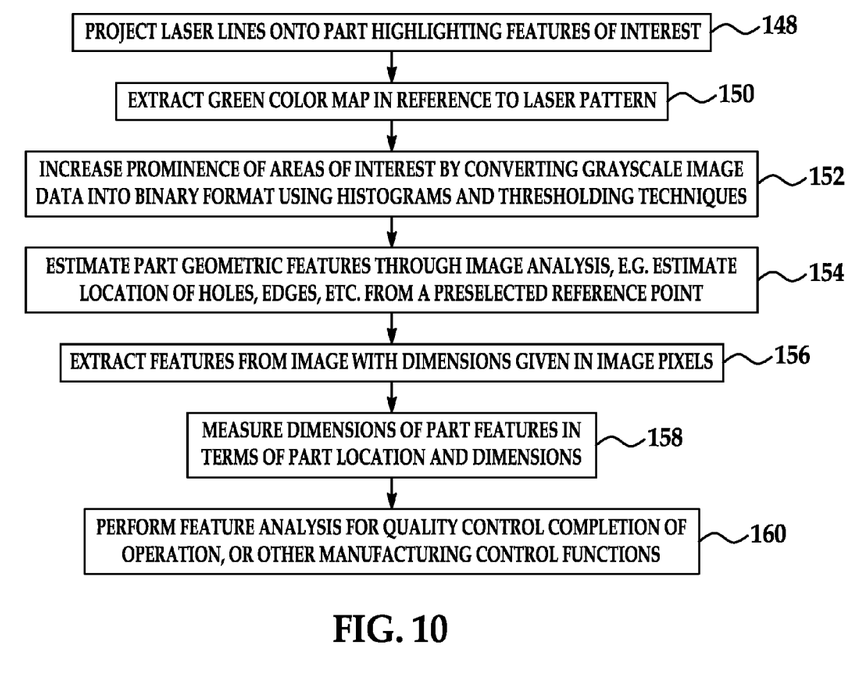
FIG. 10 is an illustration of a flow diagram of a method of generating vision data using the multi-functional vision system.
Figure 11:
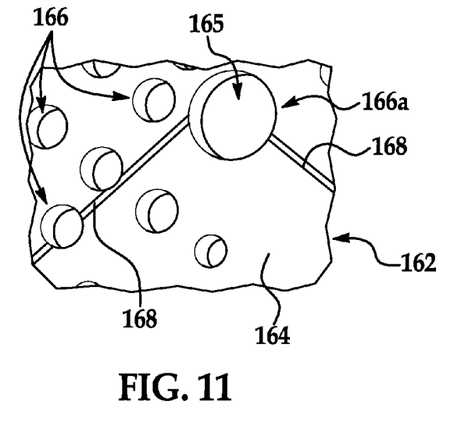
FIG. 11 is an illustration of a perspective view of a camera image of an object having laser lines projected thereon.
Figure 12:
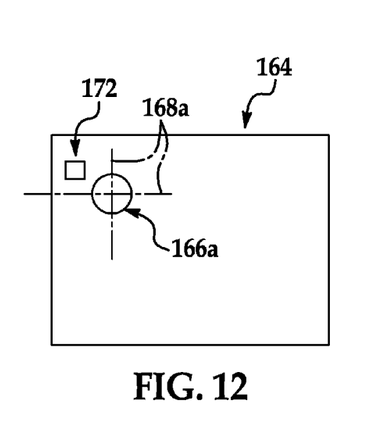
FIG. 12 is an illustration of a diagrammatic view of a camera image frame showing the use of a laser template to measure features on a viewed object.

Attention is now directed to FIGS. 10-12 which illustrate a method of determining the presence and location of features on objects that may be used by the cameras 42 in the vision system 20, including measurement of these features. At step 148 in FIG. 10, laser lines 168 are projected onto an object such as a part 164 shown in FIG. 11 in order to highlight features of interest, which in this case comprises a particular hole 166a located adjacent several other holes 166 in the part 164. One or more of the cameras 42 viewing the part 164 record one or more image frames 162 of the part 164. Next at 150 in FIG. 10, a green color map (not shown) is extracted in reference to the laser lines 168. At step 152, the prominence of the areas of interest, which in this case comprise the area surrounding the hole 166a, is increased by converting the gray scale image data into binary format using appropriate histograms and thresholding techniques which are well known in the art. Next at 154, geometric features are estimated through image analysis which, in the present example, may comprise estimating the location of the hole 166a from a preselected reference point on the part 164, which in the present example, may comprise the intersection 165 of orthogonal laser lines 168. At step 156 in FIG. 9 features such as the hole 166a are extracted from the image frame 162, wherein the dimensions of the feature are given in image pixels (not shown). Next at 158, the dimensions of the extracted features are measured in terms of their location and dimensions within the image.

FIG. 11 illustrates one technique for measuring the dimensions and locations of object features of interest. A set of laser lines 168a is projected onto the part 162 in an intersecting pattern that is centered on the feature of interest, which in this case is the hole 166a. Simultaneously, a laser template 172 is also projected onto the part 164. The template 172 has known dimensions which provide a frame of reference that can be used during image analysis to measure the dimensions and location of the hole 166a. Finally at step 160 in FIG. 10, appropriate feature analysis is performed for quality control to determine the completion of a manufacturing operation or other manufacturing control functions.

Figure 13:
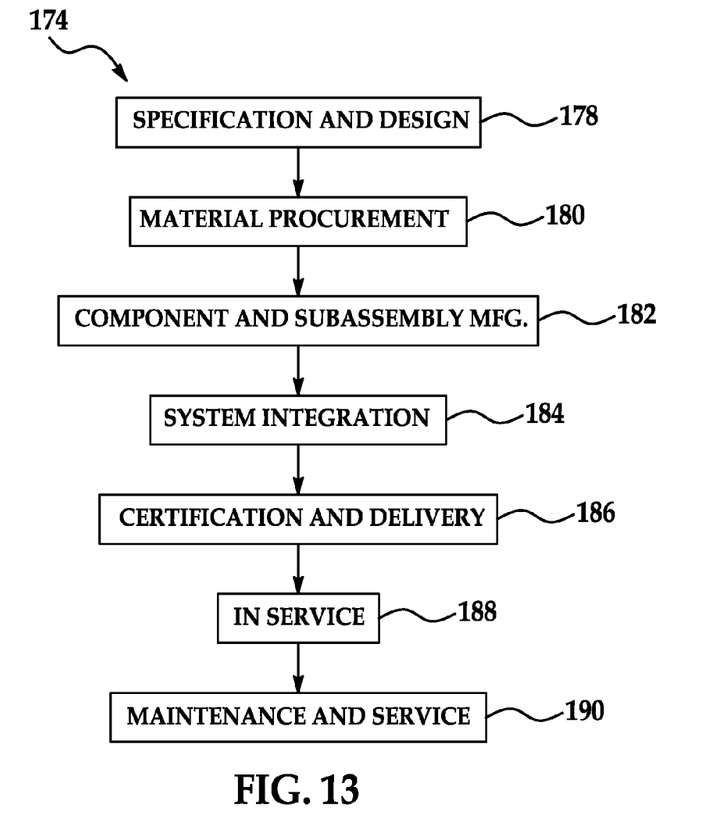
FIG. 13 is an illustration of a flow diagram of aircraft production and service methodology.
Figure 14:
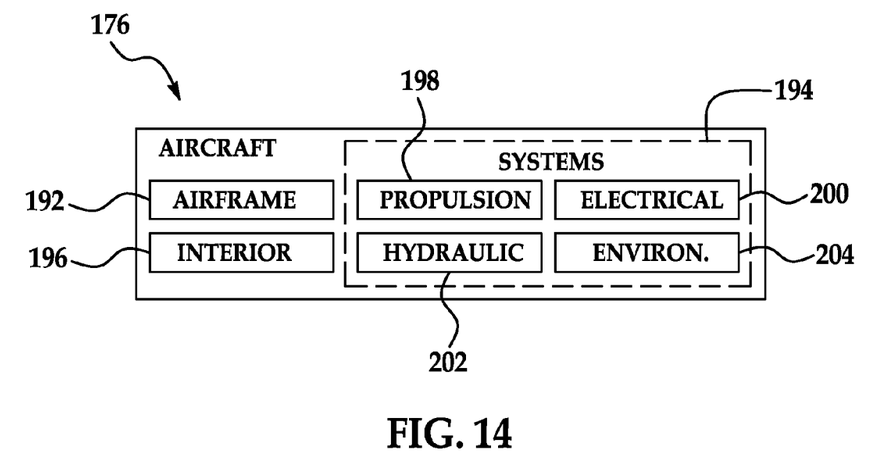
FIG. 14 is an illustration of a block diagram of an aircraft.

Embodiments of the disclosure may find use in a variety of potential applications, particularly in the transportation industry, including for example, aerospace, marine and automotive applications. Thus, referring now to FIGS. 13 and 14, embodiments of the disclosure may be used in the context of an aircraft manufacturing and service method 174 as shown in FIG. 13 and an aircraft 176 as shown in FIG. 14. Aircraft applications of the disclosed embodiments may include, for example, a wide variety of manufacturing processes and controls. During pre-production, exemplary method 174 may include specification and design 178 of the aircraft 176 and material procurement 180. During production, component and subassembly manufacturing 182 and system integration 184 of the aircraft 176 takes place, during which the multi-functional vision system 20 may be employed to monitor a manufacturing area 24 and to integrate multiple control functions such as automation control, logistics control, quality control and/or safety control. Thereafter, the aircraft 176 may go through certification and delivery 186 in order to be placed in service 188. While in service by a customer, the aircraft 176 is scheduled for routine maintenance and service 190 (which may also include modification, reconfiguration, refurbishment, and so on).

Each of the processes of method 174 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14 the aircraft 176 produced by exemplary method 174 may include an airframe 192 with a plurality of systems 194 and an interior 196. Examples of high-level systems 194 include one or more of a propulsion system 198, an electrical system 200, a hydraulic system 202, and an environmental system 204. Any number of other systems may be included. The disclosed method may be employed to assist in the fabrication, testing, inspection, and assembly of these systems. Although an aerospace example is shown, the principles of the disclosure may be applied to other industries, such as the marine and automotive industries.

Systems and methods embodied herein may be employed during any one or more of the stages of the production and service method 174. For example, parts, structures and components corresponding to production process 182 may be fabricated or manufactured in a manner similar to parts, structures and components produced while the aircraft 176 is in service. Also, one or more apparatus embodiments, method embodiments, or a combination thereof may be utilized during the production stages 182 and 184, for example, by substantially expediting assembly of or reducing the cost of an aircraft 176. Similarly, one or more of apparatus embodiments, method embodiments, or a combination thereof may be utilized while the aircraft 176 is in service, for example and without limitation, to maintenance and service 190.

Although the embodiments of this disclosure have been described with respect to certain exemplary embodiments, it is to be understood that the specific embodiments are for purposes of illustration and not limitation, as other variations will occur to those of skill in the art.

What is claimed:

1. A manufacturing control system, comprising:
   quality control, safety control, logistics, and automation control functions for controlling aircraft manufacturing operations within a manufacturing area, wherein the logistics function monitors a position and a status of aircraft components, to track the aircraft components against an expected location and time within the manufacturing area, wherein the safety function predicts a collision between vehicles within the manufacturing area, and wherein the aircraft components comprise components for assembly of aircraft;
   a vision system for viewing the aircraft components within the manufacturing area and for producing images of the viewed aircraft components, wherein the vision system includes digital cameras each having pan, tilt and zoom functions, wherein the digital cameras are directed to view the aircraft components through use of one of the pan, tilt, and zoom functions to point and zoom the digital cameras at aircraft components that are subject of the logistics function not within a field of view of the digital cameras when used to perform the safety function; and
   a systems control for extracting vision data from the images and for providing the extracted vision data to the quality control, safety control, logistics, and automation control functions.

2. The manufacturing control system of claim 1, further comprising:
   software for simulating, analyzing, and intervening with operations within the manufacturing area based on the extracted vision data.

3. The manufacturing control system of claim 1, further comprising:
   laser projection means for projecting nominal data onto the aircraft components within the manufacturing area that may be viewed by the vision system, and
   wherein the systems control is operative to use the nominal data to locate features on the aircraft components within the manufacturing area using images of the aircraft components recorded by the vision system.

4. The manufacturing control system of claim 1, wherein the automation control function is configured to control automated equipment within the manufacturing area, the logistic control function is configured to control logistics of the operations within the manufacturing area, the safety control function is configured to control safety of the operations within the manufacturing area; and the quality control function is configured to control the quality of the aircraft components manufactured in the manufacturing area.

5. The manufacturing control system of claim 4, wherein each of the manufacturing control functions includes software for interrogating the vision system and for analyzing the extracted vision data.

6. The manufacturing control system of claim 1, wherein the logistics function uses a live tracking model and a live 3-D simulation environment to track the aircraft components against the expected times and locations.

7. The manufacturing control system of claim 6, wherein the aircraft components includes a part and the logistics function determines whether assembly of the part has been completed.

8. The manufacturing control system of claim 1, wherein the aircraft components include at least one of, parts, tools, fixtures, or consumables.

9. The manufacturing control system of claim 1, wherein the logistics function provides real time monitoring of work completion including detection of incomplete work or out of sequence work.

10. A manufacturing control system, comprising:
a vision system including a plurality of vision sensors for viewing aircraft components within a manufacturing area and for recording images of the viewed aircraft components, wherein the vision sensors comprise digital cameras each having pan, tilt and zoom functions, wherein the digital cameras are directed to view the aircraft components through use of one of the pan, tilt, and zoom functions to point and zoom the vision sensors at aircraft components that are subject of a logistic function not within a field of view of the vision sensors used to perform a safety function, wherein the logistics function monitors a position and a status of the aircraft components, to track the aircraft components against an expected location and time within the manufacturing area, wherein the safety function predicts a collision between vehicles within the manufacturing area, and wherein the aircraft components comprise components for assembly of aircraft;
a plurality of manufacturing control functions for controlling manufacturing operations within the manufacturing area, each of the manufacturing control functions including means for analyzing vision data and for controlling a manufacturing operation based on results of the analysis; and
a systems control for controlling the vision system and for providing the vision data to each of the manufacturing control functions at differing preselected times using the images recorded by the vision sensors.

11. The manufacturing control system of claim 10, wherein the plurality of manufacturing control functions includes:
an automation control function configured to control automated equipment within the manufacturing area,
the logistic control function being configured to control logistics of the operations within the manufacturing area,
the safety control function being configured to control safety of the operations within the manufacturing area, and
a quality control function configured to control the quality of items manufactured in the manufacturing area.

12. The manufacturing control system of claim 10, wherein:
means for analyzing vision data includes a software program for interrogating the vision system and for analyzing the vision data.

13. The manufacturing control system of claim 10, further comprising:
software used by the systems control for simulating, analyzing, and intervening with operations within the manufacturing area based on the extracted vision data.

14. The manufacturing control system of claim 10, further comprising:
laser projection means for projecting nominal data onto aircraft components within the manufacturing area that may be viewed by the vision system, and
wherein the systems control is operative to use the nominal data to locate and measure features on the aircraft components within the manufacturing area using images of the aircraft components recorded by the vision sensors.

15. A computer implemented method comprising:
concurrently controlling a combination of safety and logistics operations within a manufacturing area, comprising:
viewing the manufacturing area with a vision system, including using vision sensors to view aircraft components within the manufacturing area and record images of the viewed aircraft components, wherein the vision sensors comprise digital cameras each having pan, tilt and zoom functions to point and zoom the vision sensors at aircraft components that are subject of a logistics function that is not within a field of view of the vision sensors used to perform a safety control function, wherein the logistics function monitors a position and a status of the aircraft components to track the aircraft components against an expected location and time within the manufacturing area, and wherein the safety function predicts a collision between vehicles within the manufacturing area;
extracting vision data from the recorded images using a processor, creating extracted vision data;
sending the extracted vision data to manufacturing control functions at differing preselected times, wherein the manufacturing control functions include the safety control and logistics functions; and
using the extracted vision data to perform the safety control and logistics functions in the manufacturing area.

16. The method of claim 15, wherein the control functions include at least one of:
determining whether work in a manufacturing operation has been completed, and
determining whether work in a manufacturing operation has been completed out-of-sequence.

17. The method of claim 15, further comprising:
simulating, analyzing, and intervening with operations in the manufacturing area based on the extracted vision data.

18. The method of claim 17, wherein:
viewing the manufacturing area with a vision system, including using vision sensors to view aircraft components within the manufacturing area, further includes viewing and recording images in real time; and
generating a 3-D simulation of operations in the manufacturing area based on the extracted vision data, further comprises generating the 3-D simulation in real time measurement feedback.

19. The method of claim 15, wherein using vision sensors to view aircraft components within the manufacturing area includes directing the vision sensors to view and record images of the aircraft components, wherein directing the vision sensors comprises directing the digital cameras to point to the aircraft components through one of panning, tilting, or zooming, wherein the aircraft components comprise at least one of:
- parts,
- vehicles,
- machines,
- assembly equipment,
- tools, and
- an inventory of consumables.

20. The method of claim 15, further comprising:
selecting and locating the aircraft components within the manufacturing area to form selected aircraft components, and
wherein using vision sensors to view the selected aircraft components within the manufacturing area and record images of the viewed selected aircraft components comprises directing the digital cameras each having pan, tilt and zoom functions to point to the selected aircraft components through one of panning, tilting, or zooming.

21. The method of claim 15, wherein the manufacturing area is an aircraft manufacturing environment.

22. A computer implemented method comprising:
directing a vision system having a digital camera to view aircraft components in an aircraft manufacturing area using pan, tilt, or zoom functions of the camera, wherein the aircraft components comprise a first aircraft component and a second aircraft component that is different than the first aircraft component;
recording images of the first aircraft component;
extracting vision data from the recorded images of the first aircraft component using a processor to create extracted vision data for the first aircraft component;
using the extracted vision data for the first aircraft component to perform a safety function, wherein the safety function predicts a collision between vehicles within the manufacturing area;
directing the vision system to view a second aircraft component in a different field of view using the pan, tilt, or zoom functions of the digital camera;
recording images of the second aircraft component;
extracting vision data from the recorded images of the second aircraft component using the processor to create extracted vision data for the second aircraft component; and
using the extracted vision data for the second aircraft component to perform a logistics function to track the second aircraft component against an expected location and time in the aircraft manufacturing area.

* * * * *